(12) United States Patent
Hessler et al.

(10) Patent No.: US 10,630,441 B2
(45) Date of Patent: Apr. 21, 2020

(54) IMPLICIT DERIVATION OF FREQUENCY SYNCHRONIZATION FROM DMRS ASSIGNMENT

(71) Applicant: Telefonaktiebolaget LM Ericsson (publ), Stockholm (SE)

(72) Inventors: Martin Hessler, Linköping (SE); Robert Baldemair, Solna (SE); Lars Lindbom, Karlstad (SE); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/070,953

(22) PCT Filed: Jan. 19, 2017

(86) PCT No.: PCT/SE2017/050044
§ 371 (c)(1),
(2) Date: Jul. 18, 2018

(87) PCT Pub. No.: WO2017/127011
PCT Pub. Date: Jul. 27, 2017

(65) Prior Publication Data
US 2019/0036662 A1    Jan. 31, 2019

Related U.S. Application Data

(60) Provisional application No. 62/280,522, filed on Jan. 19, 2016.

(51) Int. Cl.
*H04L 5/00* (2006.01)
*H04W 72/04* (2009.01)

(52) U.S. Cl.
CPC ............ *H04L 5/0048* (2013.01); *H04L 5/006* (2013.01); *H04L 5/0007* (2013.01); *H04L 5/0051* (2013.01); *H04W 72/042* (2013.01)

(58) Field of Classification Search
CPC ... H04L 5/0048; H04L 5/0007; H04L 5/0051; H04L 5/006; H04W 72/042
(Continued)

(56) References Cited

U.S. PATENT DOCUMENTS

2015/0305059 A1* 10/2015 Li .................... H04L 1/0026
                                                           370/329
2016/0094326 A1*  3/2016 Moon ............... H04L 5/0026
                                                           370/330

FOREIGN PATENT DOCUMENTS

WO         2013138814 A1      9/2013

OTHER PUBLICATIONS

Unknown, Author, "Discussion on a new UE behavior to receive PDSCH containing RBs with PSS/SSS/PBCH", 3GPP TSG RAN WG1 Meeting #83, R1-157443, Anaheim, CA, Nov. 15-22, 2015, 1-4.

* cited by examiner

*Primary Examiner* — Faisal Choudhury
(74) *Attorney, Agent, or Firm* — Sage Patent Group

(57) ABSTRACT

Techniques are disclosed for transmitting and receiving a user-specific transmission comprising user data symbols and user-specific reference signal symbols. According to one aspect, a method comprises transmitting, within a group of time-frequency resources scheduled in a first time interval for a first user, a plurality of demodulation reference signal (DMRS) symbols, where the plurality of DMRS symbols within the group of time-frequency resources are more densely arranged in the frequency domain than in the time domain; and transmitting, within the group of time-frequency resources scheduled in the first time interval for the first user, a plurality of synchronization signal (SS) symbols, where the plurality of SS symbols within the group of (Continued)

time-frequency resources are more densely arranged in the time domain than in the frequency domain.

10 Claims, 15 Drawing Sheets

(58) Field of Classification Search
USPC ......................................................... 370/329
See application file for complete search history.

IMPLICIT DERIVATION OF FREQUENCY SYNCHRONIZATION FROM DMRS ASSIGNMENT

TECHNICAL FIELD

The present invention generally relates to wireless communication networks, and particularly relates to frequency synchronization based on user-specific reference symbols.

BACKGROUND

The so-called Long Term Evolution (LTE) wireless communication networks developed by members of the 3rd-Generation Partnership Project (3GPP) use orthogonal frequency-division multiplexing (OFDM) in the downlink and Discrete Fourier Transform spread (DFT-spread) OFDM (also referred to as single-carrier frequency-division multiple access, or FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing/bandwidth as the downlink and the same number of single carrier FDMA (SC-FDMA) symbols in the time domain as OFDM symbols in the downlink.

In the time domain, LTE downlink transmissions are organized into radio frames of 10 milliseconds, each radio frame consisting of ten equally-sized subframes of length Tsubframe=1 millisecond, as shown in FIG. 2. For normal cyclic prefix, one subframe consists of 14 OFDM symbols. The duration of each symbol is approximately 71.4 microseconds.

Furthermore, the resource allocation in LTE is typically described in terms of resource blocks, where a resource block corresponds to one slot (0.5 milliseconds) in the time domain and 12 contiguous subcarriers in the frequency domain. A pair of two adjacent resource blocks in time direction (1.0 milliseconds) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of the control information. A downlink system with CFI=3 OFDM symbols as control is illustrated in FIG. 3.

The reference symbols shown in FIG. 3 are the cell specific reference symbols (CRS) and are used to support multiple functions including fine time and frequency synchronization and channel estimation for certain transmission modes.

While the development and deployment of LTE networks provides users with greatly increased wireless data rates and has enabled the development of a wide variety of mobile broadband (MBB) services, demand for these services continues to grow. In addition to this increased demand for improved bandwidth and performance, new applications for special-purpose devices, such as machine-to-machine (M2M) devices, continue to be developed. These market forces indicate that a wireless communications technology with improved flexibility is needed, to better match the variety of service requirements for mobile data applications.

There has been a rapid growth in the number of wireless devices and applications in recent years, and this trend is highly likely to continue in the future. This growth signals a need for a new radio access technology (RAT), which may be regarded as a "5G" (5th-generation) wireless technology. One of the key goals of the current plans for 5G is to expand services offered by the network beyond mobile broadband (MBB). New use cases may come with new requirements. At the same time, 5G should also support a very wide frequency range and be very flexible when it comes to deployment options.

With the emergence of new applications with highly varying application needs, i.e., quality-of-service (QoS) parameters and deployment scenarios, a single, inflexible, physical-layer technology is not adequate to achieve the desired performance characteristics. For example, some services require a shorter transmission time interval (TTI), compared to LTE, to reduce latency. In an OFDM system, shorter TTIs may be realized by changing subcarrier spacing or subcarrier bandwidth. (The terms subcarrier spacing and subcarrier bandwidth are used interchangeably herein.) Other services need support of relaxed synchronization requirements or very high robustness to delay spread—this may be done, in a system operating with cyclic prefix, by extending the cyclic prefix. These are just examples of possible requirements.

It is clear, however, that selecting parameters such as subcarrier spacing and cyclic prefix lengths is a tradeoff between conflicting goals. Thus, a radio access technology (RAT), e.g., the next generation, or 5G, advantageously provides flexible support for several variants of transmission parameters, commonly called "numerologies." Such transmission parameters might be symbol duration, which directly relates to subcarrier spacing in an OFDM system and in several other multicarrier modulation systems, number of subcarriers, or cyclic prefix duration.

Furthermore, it is beneficial to be able to simultaneously support several services on the same band. This allows for a dynamic allocation of resources (bandwidth for example) between the different services, and for efficient implementation and deployment.

One possible approach to physical layer design for a next-generation wireless system is geared towards fulfilling a wide range of varying QoS requirements including latency, reliability and throughput. In one possible new physical layer design, the scalability is adapted using different subcarrier spacing. This approach can support mixed-mode operation, which allows different subcarrier spacings to simultaneously coexist within the same frequency band. This technique might be referred to as multi-mode multi-carrier modulation or involving multiple multicarrier modulation schemes. In this context, the terms "multicarrier modulation scheme" and "multicarrier modulation mode" should be regarded as interchangeable.

The essence of the mixed-mode operation contemplated herein is as follows: at a transmitting node, two or more multicarrier signals are generated, each being composed of one or more symbols. But, the multicarrier signals have different transmission parameters, or numerologies, e.g., with respect to subcarrier spacing and/or symbol duration. In some embodiments, the symbol durations for the two signals (and other parameters for the signals) may be selected so that symbol borders align periodically, even though the symbol durations for the two signals may vary. For instance, alignment may be achieved with a 1 millisecond periodicity—this provides a good match to existing LTE techniques, so that LTE signals can be combined, in the same frequency band, with one or more other multicarrier signals having different subcarrier spacings and/or symbol durations.

Whether or not this particular approach to the next-generation physical layer is adopted, it should be appreciated that in general, a transmitter and receiver require some form of synchronization in time and/or frequency before transmissions of messages can be received reliably. In cellular systems such as LTE, base stations broadcast narrowband synchronization signals regularly in time from which devices accessing the system can perform an initial cell search, i.e. going through a synchronization procedure that includes finding the carrier frequency, identifying time reference instants, and determining a cell identity, e.g., by decoding a reference signal sequence. An LTE device that has performed initial cell search and identified the transmitting cell's identity can then complete the initial synchronization in downlink by performing a fine synchronization using cell-specific reference signals (CRS), which are transmitted across the system bandwidth and more frequently in time than the synchronization signals. The device then connects to the network via a random access procedure in which uplink time synchronization is established and communications between the device and the base station can begin. Due to oscillator drifting at both the transmitter and receiver sides, the device needs to regularly perform fine frequency synchronization based on the downlink signal, during the communications with the base station.

For the next-generation wireless communications system, a lean frame structure that omits cell-specific reference signals (CRS) has been proposed. With this approach, the reference signals required for fine synchronization and demodulation of a downlink physical data channel (PDCH) are embedded into the PDCH transmission itself. Thus, these reference signals may be considered user-specific reference signals, and may be beam-formed for a specific user, for example, along with the data transmitted to that user. Accordingly, a data transmission to a specific user may be considered "self-contained" in that it contains those reference signals needed by the receiving device for frequency synchronization and channel estimation, as well as the user data itself.

With this frame structure, the Physical Downlink Control Channel (PDCCH) and PDCH for a given user have their own reference signals for demodulation. These reference signals are typically referred to as Demodulation Reference Signal (DMRS), but these could also be other types of reference signals as will be discussed herein. Note that the DMRS should be transmitted early in the subframe to enable the receiver to perform early channel estimation, thus reducing receiver processing time.

FIG. 4 illustrates an example scenario in which two downlink subframes carry PDCCH and PDCH for each of two users. For one of the users, the PDCH uses subframe aggregation, i.e., the PDCH extends across two subframes. In this example, there are several PDCCH transmissions, for several different users; these appear in the first Orthogonal Frequency Division Multiplexing (OFDM) symbol of each subframe. Of course, other arrangements are possible. Note that different users are indicated by the use of different shadings in the illustrated PDCH and PDCCH channels in the figure. Thus, a PDCH with a given shading pattern is scheduled by the PDCCH having the same shading pattern.

For this next-generation wireless system, it has further been proposed that time-synchronization be done using a first reference signal, e.g., a Time Synchronization Signal (TSS), and that coarse-frequency-synchronization be performed using the same first reference signal or a second signal, e.g., a Frequency Synchronization Signal (FSS). These signals may resemble the Primary Synchronization Signal and/or Secondary Synchronization Signal in LTE, for example, but may be transmitted relatively infrequently. Further, it should be observed that these signals are not intended to provide a very accurate synchronization, either in time or frequency. It is generally understood that the residual time error can be handled by the cyclic-prefix in an OFDM system, while the residual frequency error is accommodated by having sufficient sub-carrier spacing.

However, with higher modulation schemes (such as 64-QAM and 256-QAM), better frequency-synchronization is needed. Existing solutions (e.g., as in LTE) reuse demodulation reference signals for this purpose, e.g., DMRS or CRS.

In short, in traditional synchronized radio systems, such as LTE, some reference signals are always present, e.g., PSS/SSS/CRS. This approach allows the UE to find these signals without communication with the network and allows the UE to keep time and frequency synchronization with the network. This approach avoids some complexity, at the expense of bad energy performance and constant interference from these always-on signals. However, in the preliminary design of next-generation systems, a lean system design that gets rid of said signals has been proposed. A problem with this latter approach, however, is that the synchronization procedure, which cannot rely on always-available reference signals, becomes more complicated. Furthermore, the overhead may increase, in terms of the synchronization signals using a large fraction of the spectrum, thus reducing the achievable data rates.

SUMMARY

Embodiments described herein provide for improved designs for reference signals to be used in self-contained user-specific transmissions. According to techniques and apparatus described below, a demodulation reference signal (DMRS) and a synchronization signal (SS) are jointly assigned to a user-specific transmission, giving a user-specific reference signal structure with good time and frequency properties, given the scheduled format of the data transmission. This gives lower overhead in the signaling and in the resource elements used for reference signals.

Techniques and apparatus for transmitting and receiving a user-specific transmission comprising user data symbols and user-specific reference signal symbols are described below. According to one aspect, a method comprises transmitting, within a group of time-frequency resources scheduled in a first time interval for a first user, a plurality of DMRS symbols, where the plurality of DMRS symbols within the group of time-frequency resources are more densely arranged in the frequency domain than in the time domain. The method also includes transmitting, within the group of time-frequency resources scheduled in the first time interval for the first user, a plurality of SS symbols, where the plurality of SS symbols within the group of time-frequency resources are more densely arranged in the time domain than in the frequency domain.

According to another aspect, a method comprises receiving, within a group of time-frequency resources scheduled in a first time interval for the receiver, a plurality of DMRS symbols, where the plurality of DMRS symbols within the group of time-frequency resources are more densely arranged in the frequency domain than in the time domain, and receiving, within the group of time-frequency resources scheduled in the first time interval for the receiver, a plurality of SS symbols, where the plurality of SS symbols within the group of time-frequency resources are more densely arranged in the time domain than in the frequency domain. The method further comprises performing channel estimation using the DMRS symbols and demodulating data symbols within the group of time-frequency resources, based on the channel estimation, and estimating or updating an estimate of a frequency error for the user-specific transmission, using the SS symbols.

According to an aspect, a transmitting apparatus comprises a transceiver circuit and a processing circuit operatively coupled to the transceiver circuit, wherein the processing circuit is configured to receive a user-specific transmission comprising user data symbols and user-specific reference signal symbols are described below. According to one aspect, the processing circuit controls the transceiver circuit to transmit, within a group of time-frequency resources scheduled in a first time interval for a first user, a plurality of DMRS symbols, where the plurality of DMRS symbols within the group of time-frequency resources are more densely arranged in the frequency domain than in the time domain. The processing circuit is also configured to transmit, within the group of time-frequency resources scheduled in the first time interval for the first user, a plurality of SS symbols, where the plurality of SS symbols within the group of time-frequency resources are more densely arranged in the time domain than in the frequency domain.

According to another aspect, a receiving apparatus comprises a transceiver circuit and a processing circuit operatively coupled to the transceiver circuit, wherein the processing circuit is configured to receive, within a group of time-frequency resources scheduled in a first time interval for the receiver, a plurality of DMRS symbols, where the plurality of DMRS symbols within the group of time-frequency resources are more densely arranged in the frequency domain than in the time domain, and receive, within the group of time-frequency resources scheduled in the first time interval for the receiver, a plurality of SS symbols, where the plurality of SS symbols within the group of time-frequency resources are more densely arranged in the time domain than in the frequency domain. The processing circuit is also configured to perform channel estimation using the DMRS symbols and demodulating data symbols within the group of time-frequency resources, based on the channel estimation, and estimate or update an estimate of a frequency error for the user-specific transmission, using the SS symbols.

Other aspects of the disclosed technology include transmitter and receiver apparatuses, computer program products and computer readable media configured to carry out the methods summarized above, and variants. These and various other methods and apparatus corresponding to the above aspects are detailed herein, as are additional details and refinements of these aspects. Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
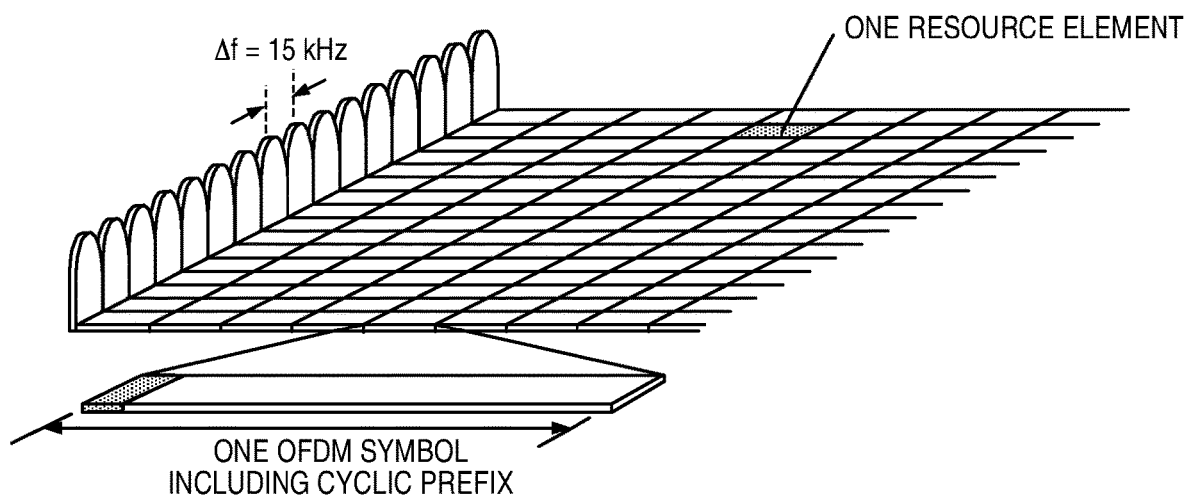
FIG. 1 illustrates a diagram illustrating an LTE downlink physical resource.
Figure 2:
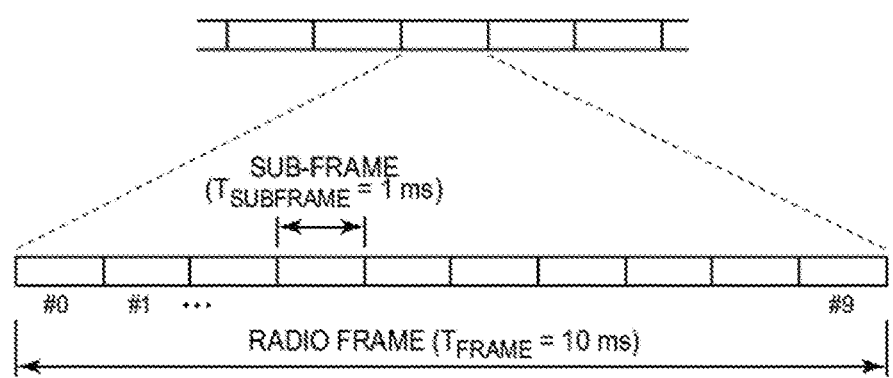
FIG. 2 illustrates a diagram of an LTE time-domain structure.
Figure 3:
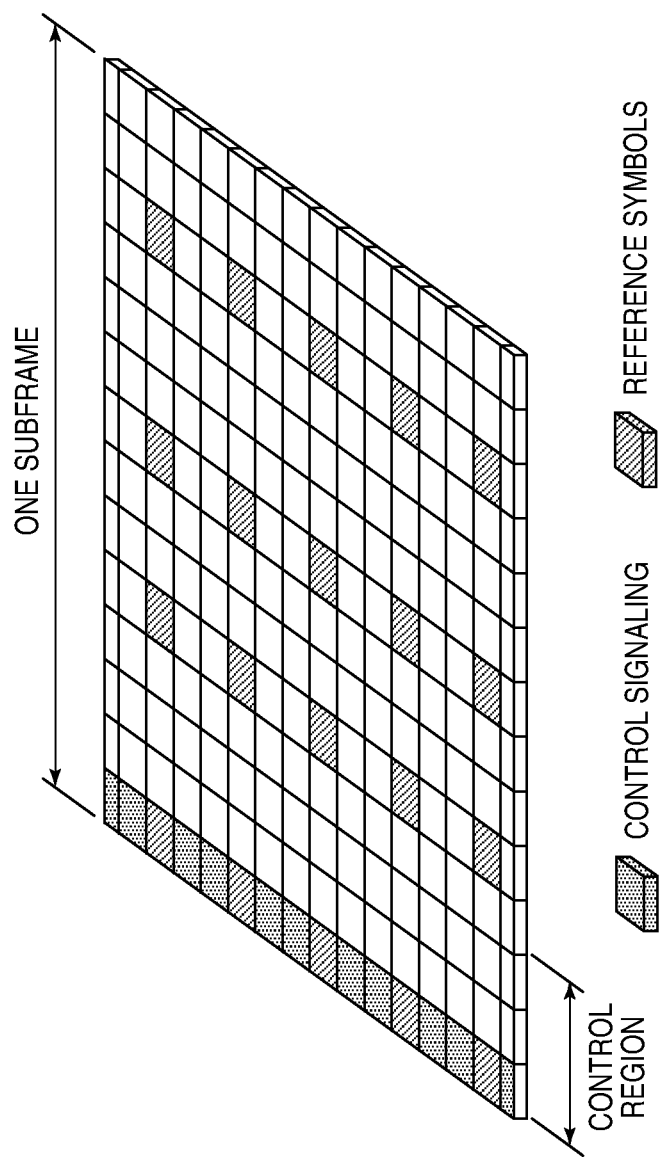
FIG. 3 illustrates a diagram of an LTE downlink subframe.
Figure 4:
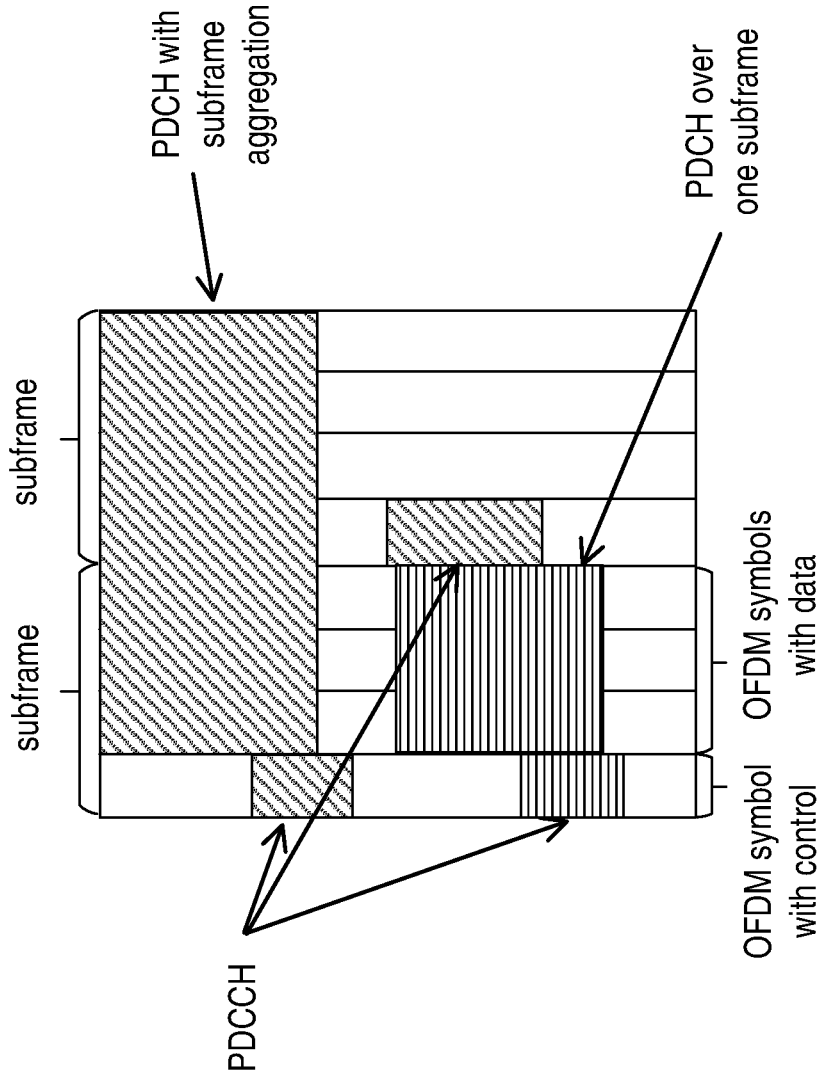
FIG. 4 illustrates two downlink subframes with control regions and data regions.

As noted above, some proposals for the preliminary design of next-generation systems involve a lean system design that eliminates some reference signals. A problem with these proposals, however, is that the synchronization procedure, which can no longer rely on always-available reference signals, becomes more complicated. Further, the overhead may increase when synchronization signals use a large fraction of the spectrum, thus reducing the achievable data rates.

One possible approach, for example, is to re-use DMRS symbols for frequency synchronization. (In the present disclosure, unless the context indicates otherwise, the term "DMRS" refers to a demodulation reference signal, which may comprise one or more demodulation reference signal symbols, or "DMRS symbols.") It will be appreciated that DMRS symbols are primarily intended to be used for channel estimation purposes to allow demodulation of the transmitted user data. Re-using DMRS symbols for frequency synchronization purposes is inefficient, however, since the time density needed for frequency synchronization is relatively high, for good frequency synchronization performance. At the same time, the frequency density needed for good demodulation performance is also relatively high, compared to the relatively low time density needed to maintain good demodulation performance. Hence if the same signal is used for both purposes, the signal must have high densities in both the frequency and time dimensions, and unnecessarily high overhead is incurred.

With the techniques detailed herein, the frequency synchronization needed to receive a user-specific transmission is performed without the use of DMRS symbols (or at least without a heavy reliance on DMRS symbols). This is achieved by creating a joint reference signal structure that is divided into a DMRS part, having relatively high density in the frequency domain and relatively low density in the time domain, and a distinct synchronization signal (SS) part, having a relatively high density in the time domain and a relatively low density in the frequency domain.

In some embodiments of the disclosed techniques, the control signaling specifying the one of several possible SS patterns or structures for a given transmission is implicit in relation to the DMRS part. Note that this could be reformulated in some cases as the SS and DMRS patterns are both implicitly derived from some other parameter. In some embodiments, the DMRS pattern may be derived from the SS pattern. Because current solutions contain a DMRS assignment, the techniques described herein will be described in terms of the SS configuration derived from DRMS or from some other parameters signaled to the receiving device. However, it will be appreciated that the other approaches mentioned here may also be applied.

Embodiments of the techniques described herein enable scheduling of data transmissions, including a low overhead DMRS, by implicitly deriving the SS transmission from the scheduling of DMRS. This allows both more efficient signaling and a more efficient reference signal structure, to enable good demodulation performance and support frequency synchronization.

In embodiments described below, the reference signal used for frequency synchronization is derived implicitly from the properties of a data transmission.

In some embodiments, the frequency synchronization signal is always sent jointly with DMRS. In other embodiments, the presence or absence of SS in any given subframe may be implicitly indicated—e.g., such that it may be determined from a timer or a counter since the last decoded (and acknowledged) subframe that contained SS for the user. In some embodiments, the presence and/or location of the SS is explicitly signaled using at least one additional bit in the grant format. Further, in some embodiments, the resources for SS transmitted to other users are blanked (i.e., known to a given user as not being available for use by that user), while in other embodiments or instances, the same SS may be assigned to all users of a particular group of time-frequency resources. For example, the SS are transmitted using a beam-former suitable for all users scheduled in the same or overlapping resources.

In some embodiments, as detailed further below, the DMRS is mapped to separate resources, compared to SS. In some embodiments, DMRS and SS share some resources, but in these cases, some resources are used only for the SS.

It will be appreciated that the UE procedure for deriving frequency synchronization from the SS can be receiver-implementation-specific. However, from a network and standardization point of view, there may be two main use cases for the SS. The sections below are used to describe different options for the implicit derivation of synchronization signal positions. One of these two main cases may be selected by the receiver by estimating the current frequency synchronization.

Frequency Synchronization within a Single Transmission

In some cases, the type and placement of SSs are predetermined in the standard or by previous signaling. For example, a first transmission is from the network or from a particular cell when a UE is in mobility, or when a UE is receiving a paging transmission. In these scenarios, the transmission can be configured with enough reference signals so that it is sufficiently robust, i.e., such that it can be correctly decoded with large frequency offsets. Alternatively, an estimated frequency synchronization, obtained using the SS within the transmission, is used to compensate the received signal before the decoding.

Figure 5:
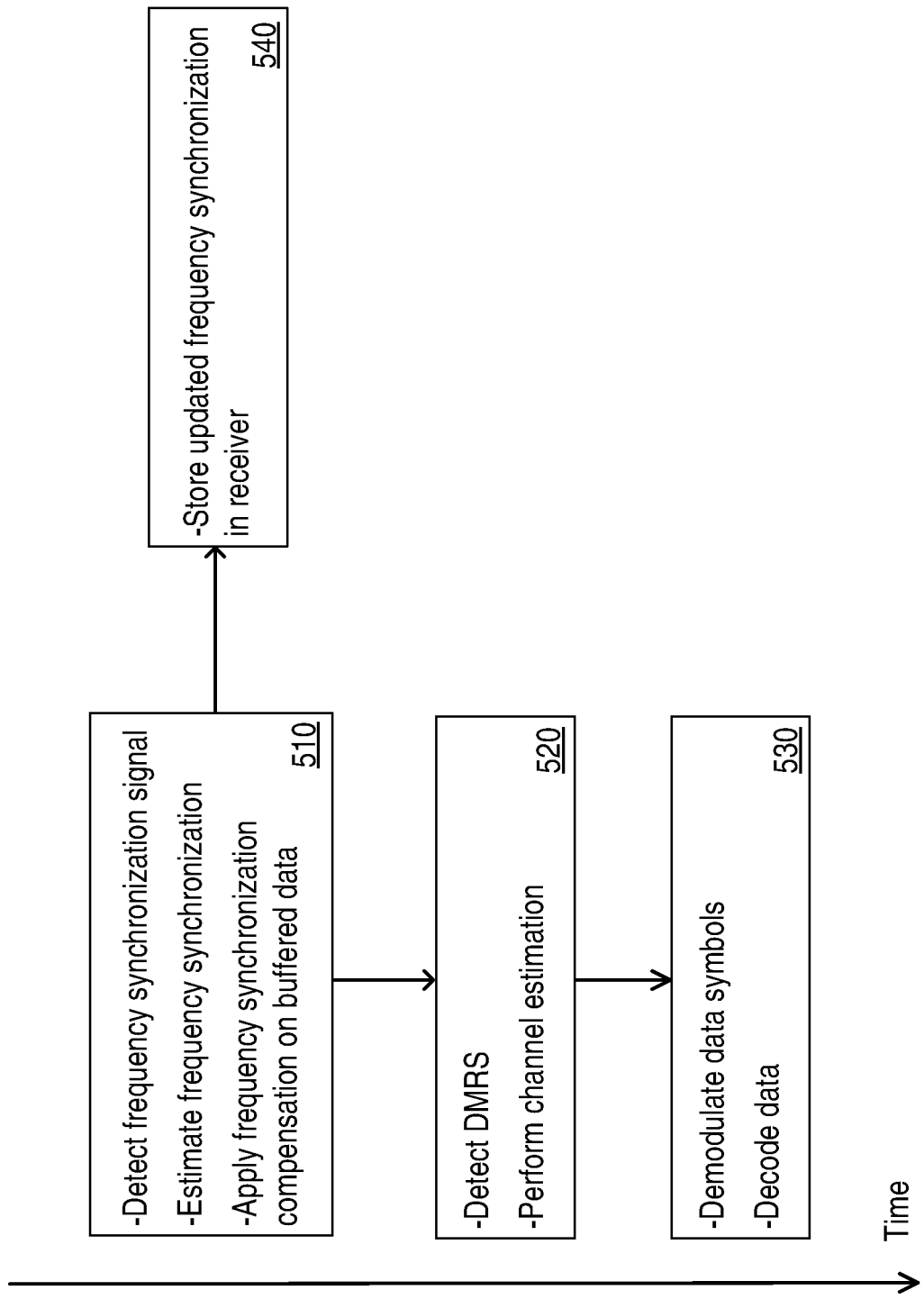
FIG. 5 illustrates the performing of frequency synchronization using synchronization signals within the same transmission and compensating received data before performing channel estimation and demodulating/decoding data symbols.

In some embodiments, the structure of the SS is known from the type of transmission. Hence, in this use case, shown by FIG. 5, the UE can implement the demodulation by first estimating frequency offset, using the SS. This is shown in block 510 of FIG. 5. The UE can then compensate the received signal based on the estimated frequency offset, e.g., by compensating buffered time-domain data, prior to performing a Fast-Fourier Transform on the received data. The UE can then perform the channel estimation, based on the frequency-compensated data. This is shown by block 520. This can be followed by the rest of the data reception and decoding shown by block 530. Note that the frequency synchronization obtained according to this approach is stored by the receiving device, for use with subsequent transmissions, as shown by block 540.

Frequency Synchronization with Subsequent Transmissions

In some instances, the receiver can have a sufficiently good frequency estimate, prior to receiving a particular transmission, for the purpose of demodulating that particular transmission. However, a frequency estimate using the SS in the current transmission is needed, nonetheless, to adjust the frequency offset to be used to compensate subsequent transmissions. Thus, for example, given a sequence of data transmissions, the receiver may have already received good frequency synchronization after the first transmission or two, but still needs to maintain the synchronization for future transmissions. In these cases, the currently transmitted SS is not used for the demodulation and decoding of the current transmission.

Figure 6:
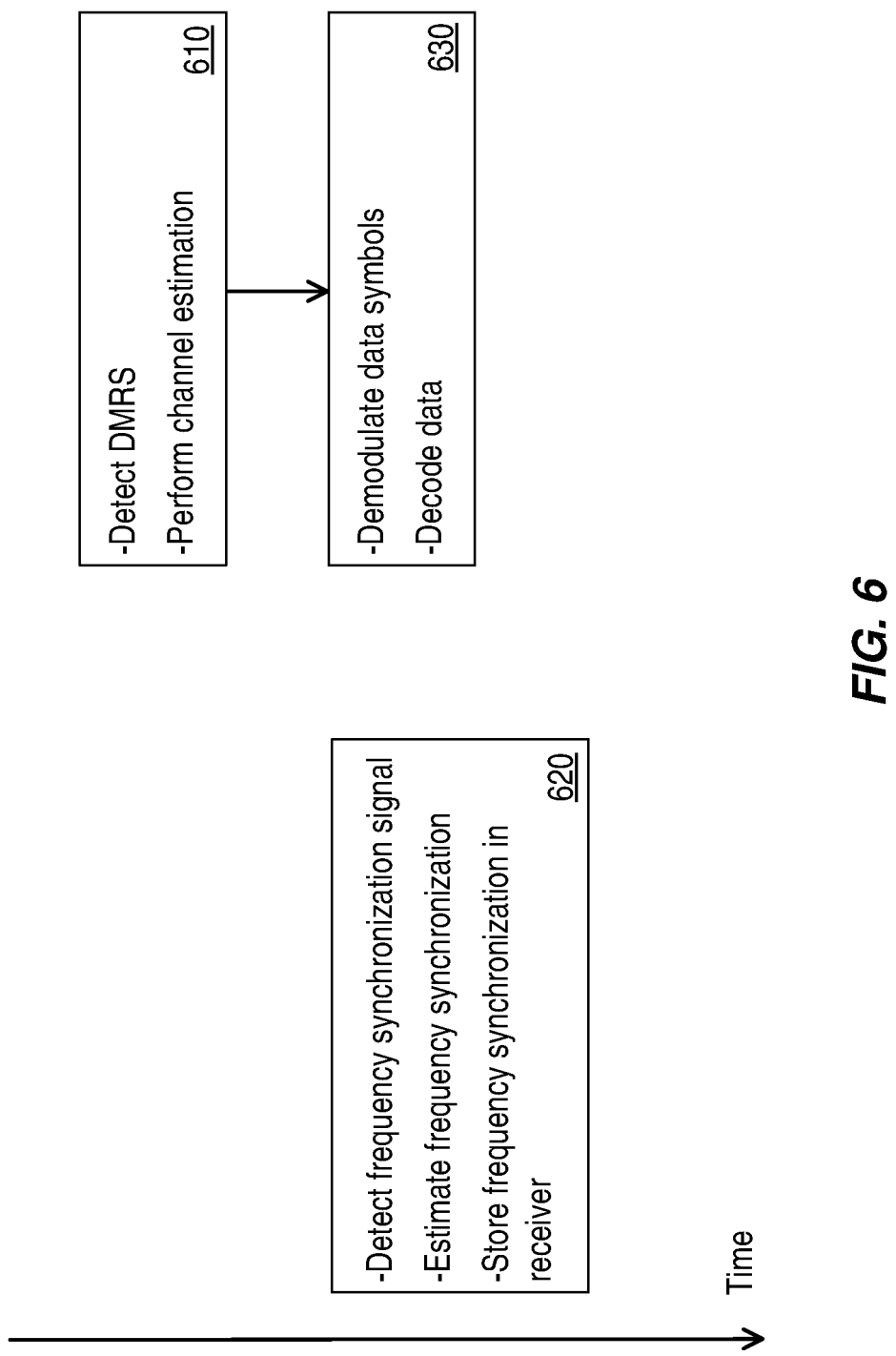
FIG. 6 illustrates the performing of frequency synchronization using synchronization signals in a transmission, for use in subsequent transmissions.

This is shown in FIG. 6. As seen in the figure, the currently transmitted SS is not used for the demodulation and decoding of the current transmission. Rather, any frequency compensation that is needed is performed using the previously obtained frequency synchronization information. This allows a frequency synchronization update using the currently transmitted SS to be performed (block 620) simultaneously with the demodulation and decoding of the data symbols (block 630), which follows the channel estimation shown by block 610. Note that if a receiver detects that a previously determined frequency synchronization was worse than expected, i.e., that the previously determined frequency synchronization results in poor performance when demodulating and decoding the current transmission, the receiver can fall back to the procedure described in the preceding section, where a frequency synchronization is performed using the currently transmitted SS, prior to (again) demodulating and decoding the currently transmitted user data.

Implicit Derivation of Frequency Synchronization Requirement and Time Separation from MCS In a scheduling grant, a field called MCS (Modulation and Coding Scheme) may be used to indicate the modulation and the channel coding to be used for a transmission. The signaled MCS is implicitly coupled to a signal-to-interference-plus-noise ratio (SINR) needed to support this coding and modulation scheme. According to some embodiments of the presently disclosed techniques, this MCS can be translated into a frequency synchronization accuracy requirement for the format, and may thus imply a separation in time between components of the frequency synchronization signal. Note that the separation in time between components of the SSs has an impact on the accuracy of the frequency synchronization, with a wider separation allowing for a more accurate frequency synchronization, all other things being equal.

The separation also has an impact on the maximum possible frequency error that can be estimated—if the possible frequency error is not already constrained, an "aliasing" effect arising from the component separation can create ambiguities in the frequency error determined from the SS. More closely spaced SS components allow for estimation of larger frequency errors, and vice-versa.

Figure 7:
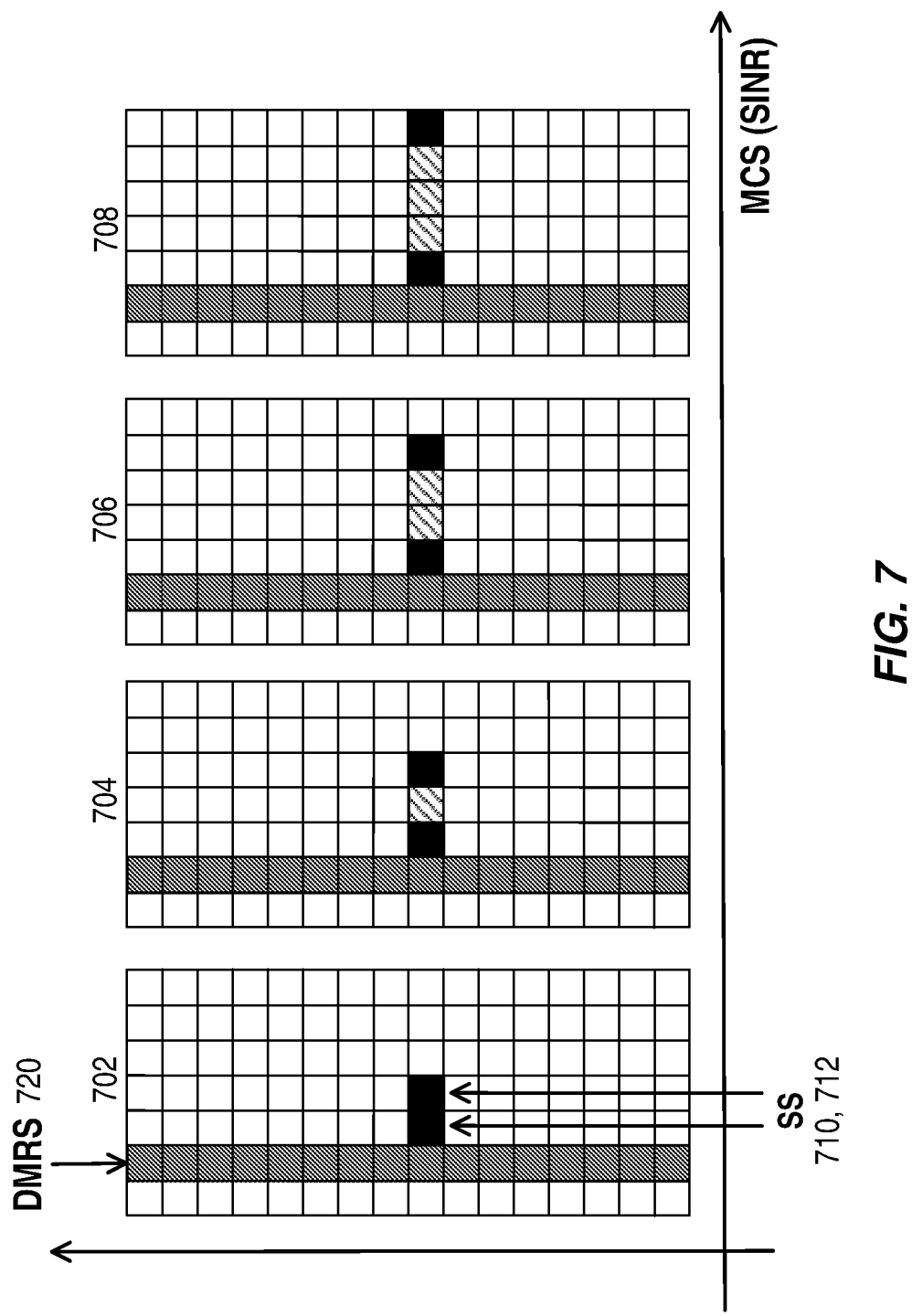
FIG. 7 illustrates synchronization signal symbol separation versus several modulation and coding schemes.

Because a higher accuracy frequency synchronization is generally needed for higher-order modulation schemes, the separation between synchronization symbols within a given transmission may increase with MCS. This is illustrated in FIG. 7, which shows the necessary time separation (minimum spacing) between SS components for each of several MCS (702, 704, 706, 708). For example, the SS components 710, 712 are illustrated with solid black squares. Note that the DMRS 720 in the illustrated signal is confined to one OFDM symbol, in this example, but has a high density in the frequency domain. The SS, on the other hand, has a relatively low density in the frequency domain. It may appear on only one subcarrier per resource block, for example (MCS 702), or may be spaced even more widely in the frequency domain (MCS 708).

Figure 8:
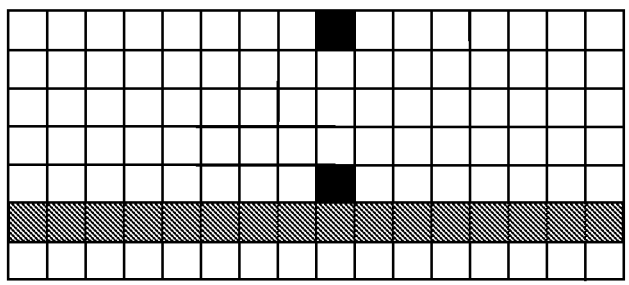
FIG. 8 illustrates examples of synchronization signal component density.
Figure 8:
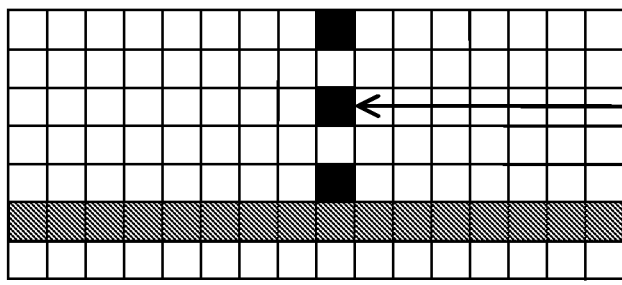
Figure 8:
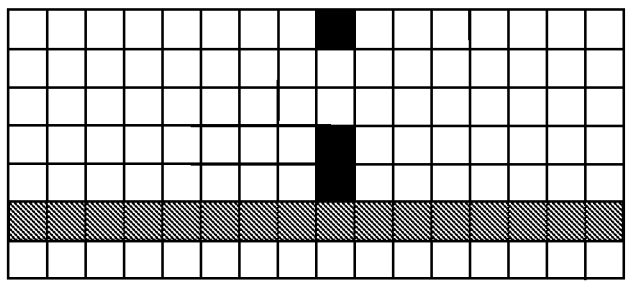

Note that intermediate symbols can also be assigned for SS, since the separation in time is inversely proportional to the maximum frequency error that can be estimated. In general, it is important to have a sufficiently large separation to obtain accurate estimation; this is particularly important in low SINR conditions. Unless very large frequency errors are anticipated, having two adjacent resource elements for SS, as illustrated at the left-hand side of FIG. 7, is suboptimal. For instance, if the maximum allowed frequency error is two kHz, this can correspond to a need for the SS to include synchronization symbols in every second OFDM symbol. This is shown in FIG. 8 at diagram (b), with intermediate (third) SS 802. (Note that the distance needed in terms of number of symbols for a specific frequency error depends on the symbol duration.) However, if only 1 kHz frequency errors are anticipated or allowed, the intermediate symbol shown in FIG. 8 (b) can represent unnecessary overhead. In this case, it can be omitted, as seen in FIG. 8 (a). Note further that it is possible to have a non-uniform distribution of the synchronization signal components, e.g., as shown in FIG. 8 (c).

In the examples shown in FIGS. 7 and 8 and discussed above, the SS is mapped to resource elements at only one frequency (subcarrier). To improve synchronization accuracy, SS can be mapped to multiple frequencies (subcarriers).

The procedure discussed above implies that in a system the receiver acquires a first synchronization on a first signal giving, for example, a 2-kHz frequency error. This implies that a first data transmission cannot support high MCS without improving the frequency synchronization. After this first transmission including SS, the frequency error for the receiver decreases to, for example, 0.5 kHz. With this better synchronization, a higher MCS can be used in a subsequent transmission. Further, due to the better synchronization a larger separation can be supported, without aliasing problems and an even further improved frequency synchronization can be archived due to the larger separation on the second transmission. Accordingly, it will be appreciated that the SS structure for transmissions to a given user may vary from one transmission to another, in some embodiments.

Derivation of Frequency Shifts of Synchronization Signal

Figure 9:
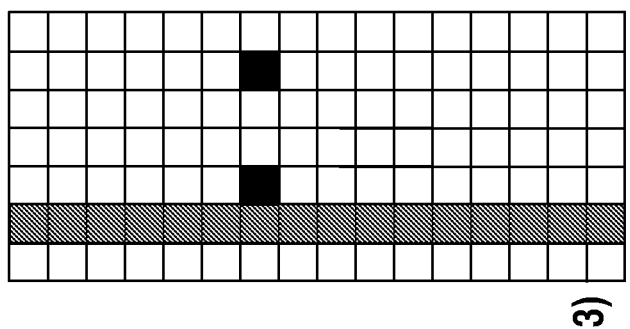
FIG. 9 illustrates examples of synchronization signal offsets, to provide non-colliding synchronization signals.
Figure 9:
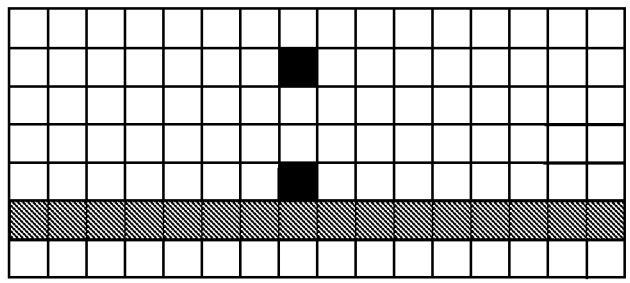
Figure 9:
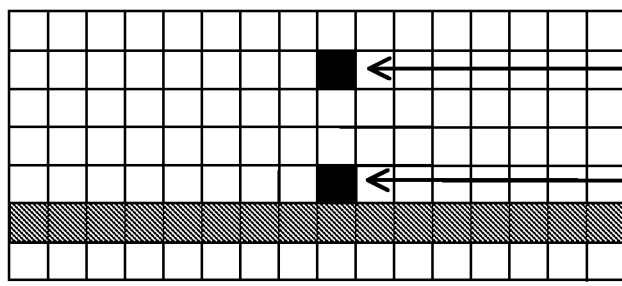
Figure 9:
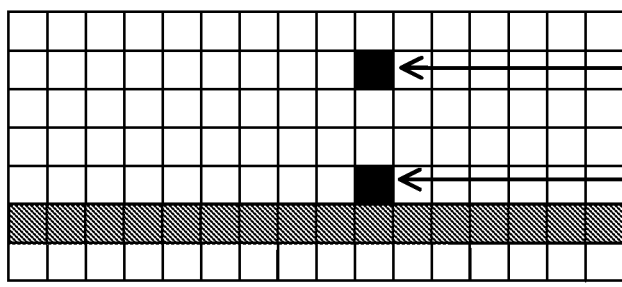

In order to assign different non-colliding SS to different users, a sub-carrier offset for the SS can in some embodiments be associated with the DMRS sequence for the user or with a UE-specific parameter. For example, if there are DMRS number 0 to number 15 defined in a system, then the assignment of a given DMRS implies a particular associated SS sub-carrier offset. A DMRS can be associated with an antenna port and orthogonal to other reference signals by using cyclic shifts, OCC (orthogonal cover codes), frequency mappings, time mapping, etc. Hence, for example, if a UE is assigned a DMRS number between 0 and 3, in some embodiments, this may be associated with a first shift of SS. The total range of DMRS numbers corresponds to mapping the SS to subcarriers with four different sub-carrier offsets. Example offsets between 4 and 7 are illustrated in FIG. 9, for example, where the offset may be specified in relation to the first sub-carrier used for DMRS. In FIG. 9, SSs 710, 712 have one offset, while SSs 910, 912 illustrate another offset. In some other embodiment some pseudo random procedure is used to derive the sub-carrier shift. For example, the UE Identity could be used by calculating $ID_{UE}$ mod N→ $SS_{OFFSET}$.

Combined DMRS and Synchronization Signal

Figure 10:
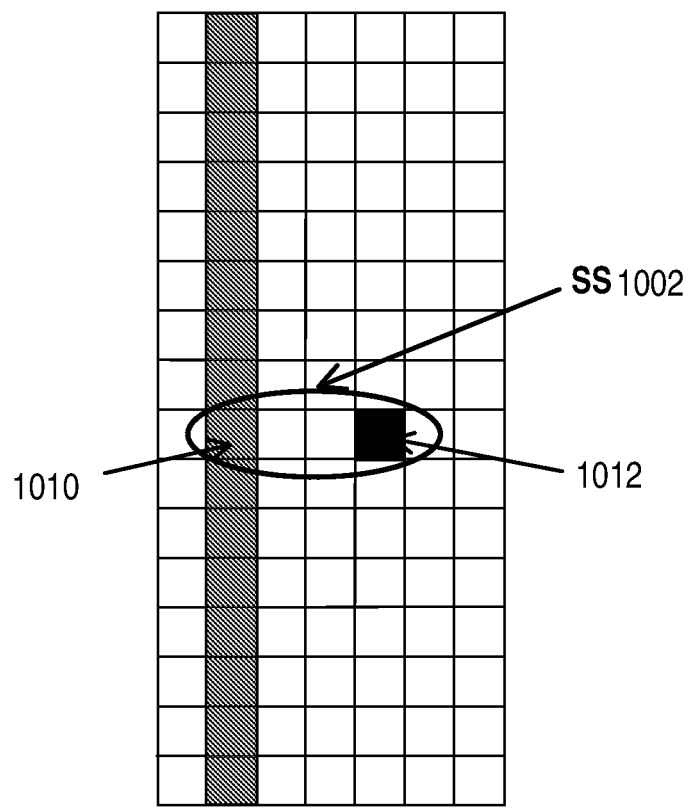
FIG. 10 shows an example synchronization signal that is partly composed of demodulation reference signal symbol(s) as well as a dedicated synchronization signal symbol.

DMRS symbols are typically allocated to early resources in a subframe, to enable early decoding of data. As shown in several of the attached figures, the SS signal requires components separated in time to enable frequency error estimation. In some embodiments, the first component could be (part of) the DMRS. The second (and potentially subsequent) components could be symbols assigned to resource elements in later symbols. An example according to this approach is shown in FIG. 10, where the SS 1002 can involve a first component 1010 in the DMRS and a second component 1012 that comes later. Although in this example, the SS 1002 consists only of resource elements at one frequency (subcarrier), the generalization of this approach to multiple frequencies (subcarriers) can be envisioned.

Figure 11:
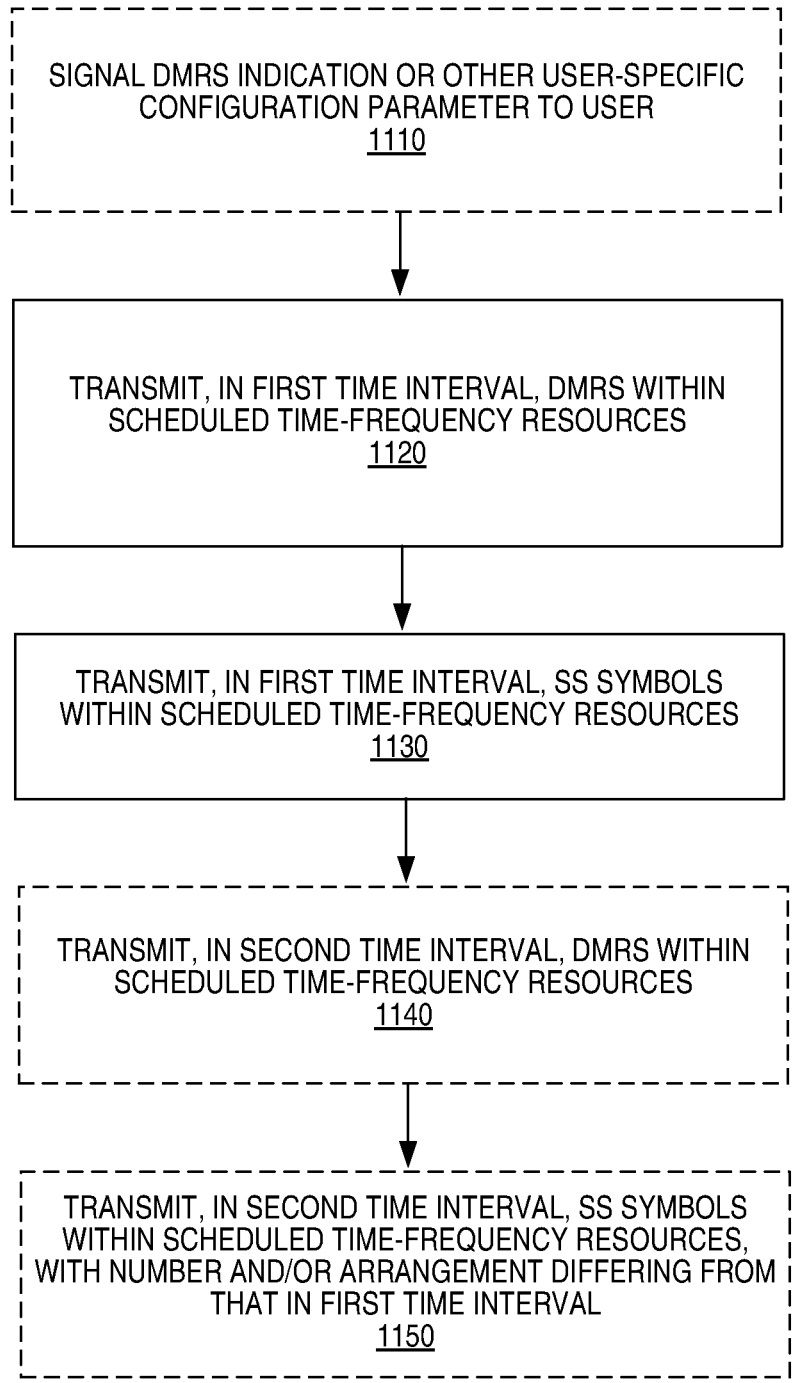
FIG. 11 is a process flow diagram illustrating an example method carried out by a transmitter apparatus.

FIG. 11 is a process flow diagram illustrating an example method as carried out in a transmitting apparatus, such as a base station. The illustrated method, which is consistent with at least some of the enumerated example embodiments provided above, comprises transmitting, within a group of time-frequency resources scheduled in a first time interval for a first user, a plurality of DMRS symbols, where the plurality of DMRS symbols within the group of time-frequency resources are more densely arranged in the frequency domain than in the time domain. This is shown at block 1120. The method further includes transmitting, within the group of time-frequency resources scheduled in the first time interval for the first user, a plurality of SS symbols, where the plurality of SS symbols within the group of time-frequency resources are more densely arranged in the time domain than in the frequency domain. This is shown at block 1130.

In some embodiments, as discussed above, the plurality of SS symbols within the group of time-frequency resources are on a single subcarrier. In some embodiments, the DMRS symbols within the group of time-frequency resources are on a single OFDM symbol. In any of these embodiments, the plurality of SS symbols may comprise a first symbol positioned in an OFDM symbol immediately following an OFDM symbol comprising DMRS symbols, and a second symbol positioned in the last OFDM symbol in the first time interval. In some of these latter embodiments, the plurality of SS symbols further comprises a third symbol positioned in an OFDM symbol between the OFDM symbols containing the first and second symbols. This third symbol may thus be referred to as an intermediate symbol.

In some embodiments, the method further comprises transmitting, within a group of time-frequency resources scheduled in a second time interval for the first user, a plurality of DMRS symbols, where the plurality of DMRS symbols within the group of time-frequency resources scheduled in the second time interval for the first user are more densely arranged in the frequency domain than in the time domain. This is shown at block 1140, which is shown with a dashed outline to indicate that it need not be present in every instance of the illustrated method. The method still further comprises transmitting, within the group of time-frequency resources scheduled in the second time interval for the first user, a plurality of SS symbols, where the plurality of SS symbols within the group of time-frequency resources scheduled in the second time interval for the first user are more densely arranged in the time domain than in the frequency domain. Generally, the number and/or arrangement of the SS symbols or the DMRS symbols, or both, may differ from the first time interval to the second time interval—in the illustrated example, the number and/or arrangement of the SS symbols in the second time interval differs from the first time interval. This is shown at block 1150.

In some of these embodiments, the minimum spacing in the time domain between SS symbols is greater in the second time interval than in the first time interval. In some embodiments, the modulation scheme applied to data symbols transmitted to the user in the first interval differs from the modulation scheme applied to data symbols transmitted to the user in the second interval, and the method further comprises selecting a number and/or arrangement of the SS symbols in the first and second time intervals based on the respective modulation schemes.

In some embodiments, the DMRS symbols for the first user are transmitted in the first and second time intervals using at least some resource elements that carry DMRS symbols for one or more other users in the first and second time intervals, while the SS symbols for the first user are transmitted in the first and second time intervals using resource elements that are used only for the SS symbols for the first user in the first and second time intervals. In some of these and in some other embodiments, the method further comprises signaling, to the first user, an indication of an DMRS structure and/or sequence, without signaling any explicit indication of a SS symbol structure or sequence, where the number and/or arrangement of the SS symbols transmitted to the user in the first time interval depends on the indicated DMRS structure and/or sequence. This is shown at block 1110 of FIG. 11. In other embodiments, the method further comprises signaling, to the first user, a user-specific configuration parameter, without signaling any explicit indication of a DMRS structure and/or sequence and without signaling any explicit indication of a SS symbol structure or sequence, where the number and/or arrangement of at least the SS symbols transmitted to the user in the first time interval depends on the signaled user-specific configuration parameter. This is also illustrated at block 1110 of FIG. 11.

Figure 12:
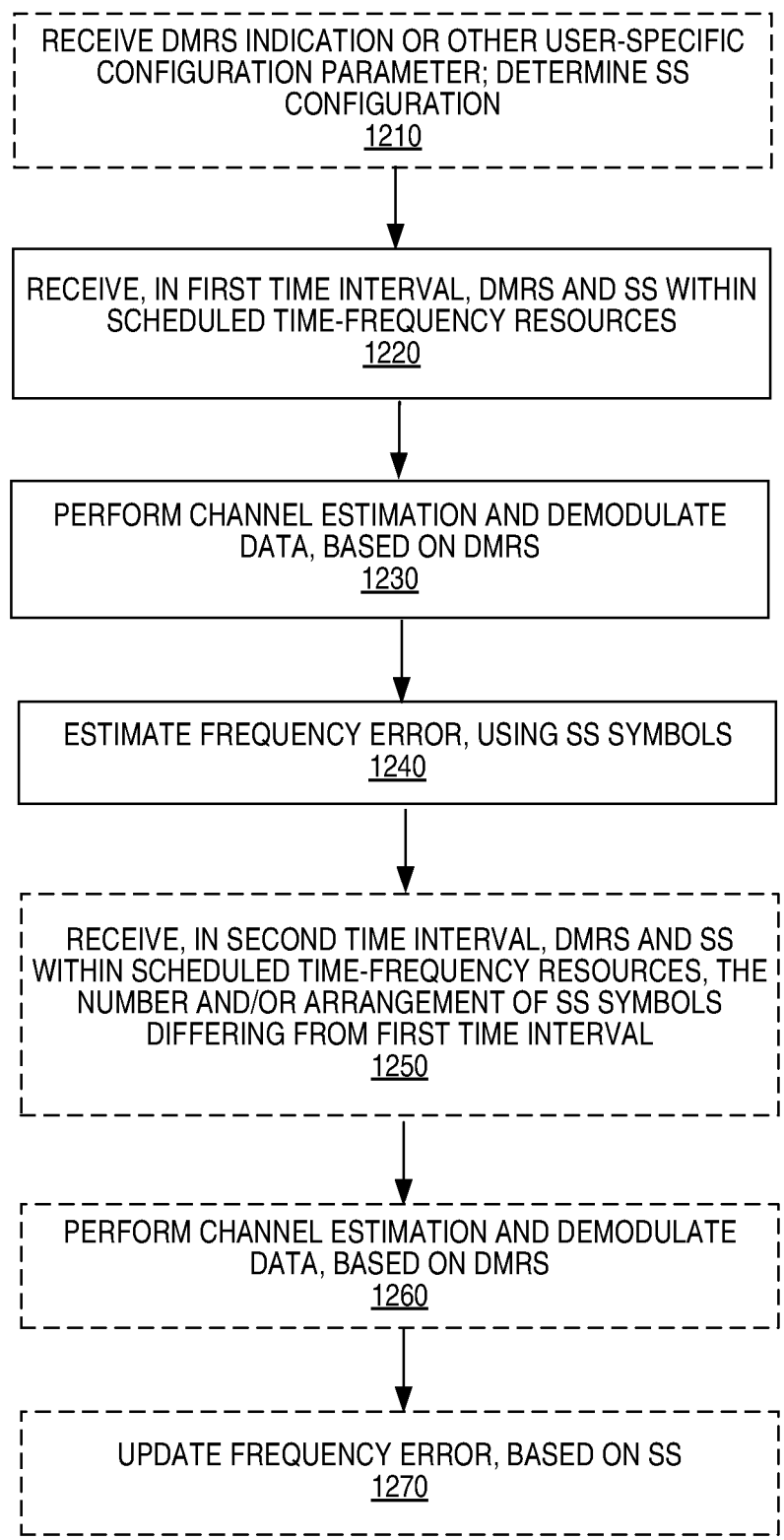
FIG. 12 is a process flow diagram illustrating an example method carried out by a receiver apparatus.

FIG. 12 is a process flow diagram illustrating an example method as carried out in a receiving apparatus, such as a base station. The illustrated method, which is consistent with at least some of the enumerated example embodiments provided above, comprises receiving, within a group of time-frequency resources scheduled in a first time interval for the receiver, a plurality of DMRS symbols, where the plurality of DMRS symbols within the group of time-frequency resources are more densely arranged in the frequency domain than in the time domain, and receiving, within the group of time-frequency resources scheduled in the first time interval for the receiver, a plurality of SS symbols, where the plurality of SS symbols within the group of time-frequency resources are more densely arranged in the time domain than in the frequency domain. This is shown at block 1220.

The method further comprises performing channel estimation using the DMRS and demodulating data symbols within the group of time-frequency resources, based on the channel estimation, as shown at block 1230, and estimating or updating an estimate of a frequency error for the user-specific transmission, using the SS symbols, as shown at block 1240. In some embodiments, the estimating or updating of a frequency error for the user-specific transmission is performed prior to performing the channel estimation and demodulating the data symbols, and the method further comprises compensating received signal data for the frequency error prior to performing the channel estimation and demodulating the data symbols. This was shown in FIG. 5. In other embodiments, the estimating or updating of a frequency error for the user-specific transmission is performed simultaneously with and/or after performing the channel estimation and demodulating the data symbols, and performing the channel estimation and demodulating the data symbols is performed using received signal data that has been compensated according to a previously estimated or updated frequency error. This was shown in FIG. 6.

In some embodiments, as discussed above, the plurality of SS symbols within the group of time-frequency resources are on a single subcarrier. In some embodiments, the DMRS symbols within the group of time-frequency resources are on a single OFDM symbol. In any of these embodiments, the plurality of SS symbols may comprise a first symbol positioned in an OFDM symbol immediately following an OFDM symbol comprising DMRS symbols, and a second symbol positioned in the last OFDM symbol in the first time interval. In some of these latter embodiments, the plurality of SS symbols further comprises a third symbol positioned in an OFDM symbol between the OFDM symbols containing the first and second symbols.

In some embodiments, the method further comprises receiving, within a group of time-frequency resources scheduled in a second time interval for the receiver, a plurality of DMRS symbols, where the plurality of DMRS symbols within the group of time-frequency resources scheduled in the second time interval for the receiver are more densely arranged in the frequency domain than in the time domain, and receiving, within the group of time-frequency resources scheduled in the second time interval for the receiver, a plurality of SS symbols, where the plurality of SS symbols within the group of time-frequency resources scheduled in the second time interval for the receiver are more densely arranged in the time domain than in the frequency domain. This is shown at block 1250 in FIG. 12, which is shown with a dashed outline to indicate that it need not appear in every instance of the illustrated method. Generally, the number and/or arrangement of the SS symbols or the DMRS, or both, may differ from the first time interval to the second time interval; in the illustrated example, the number and/or arrangement of SS symbols differs from the first time interval to the second.

In these embodiments, the method still further comprises performing channel estimation using the DMRS symbols within the group of time-frequency resources scheduled in the second time interval for the receiver and demodulating data symbols within the group of time-frequency resources scheduled in the second time interval for the receiver, based on the channel estimation—this is shown at block 1260. The method still further comprises estimating or updating an estimate of a frequency error for the user-specific transmission, using the SS symbols within the group of time-frequency resources scheduled in the second time interval for the receiver. This is shown at block 1270.

In some embodiments, the minimum spacing in the time domain between SS symbols is greater in the second time interval than in the first time interval. In some embodiments, the modulation scheme applied to data symbols transmitted to the receiver in the first interval differs from the modulation scheme applied to data symbols transmitted to the receiver in the second interval, and the method further comprises identifying a number and/or arrangement of the SS symbols in the first and second time intervals based on the respective modulation schemes.

In some embodiments, the DMRS symbols for the receiver are transmitted in the first and second time intervals using at least some resource elements that carry DMRS symbols for one or more other users in the first and second time intervals, and the SS symbols for the receivers are transmitted in the first and second time intervals using resource elements that are used only for the SS symbols for the receivers in the first and second time intervals.

In some embodiments, the method further comprises receiving signaling that includes an indication of an DMRS structure and/or sequence, without receiving any explicit indication of a SS symbol structure or sequence, and the method further comprises identifying the number and/or arrangement of the SS symbols transmitted to the receiver in the first time interval based on the indicated DMRS structure and/or sequence. This is shown at block 1210 of FIG. 12. Alternatively, the method may comprise receiving signaling that includes a user-specific configuration parameter, without receiving any explicit indication of a DMRS structure and/or sequence and without receiving any explicit indication of a SS symbol structure or sequence, wherein the method further comprises identifying a number and/or arrangement of at least the SS symbols transmitted to the receiver in the first time interval, based on the signaled user-specific configuration parameter. This alternative is also shown in block 1210 of FIG. 12.

In some cases, the arrangement of the SS symbols can involve spacing, shifts or sub-carrier offsets of SS symbols based on DMRS structure and/or sequence, such as DMRS number assignments. This was described with respect to FIG. 9, for example.

The methods illustrated in FIGS. 11 and 12, and the variants discussed above, may, as a general matter, be implemented in any wireless node. In some embodiments, however, the method illustrated in FIG. 11 and/or the illustrated method's variants are implemented in a wireless base station of a wireless communications network, while the method illustrated in FIG. 12 and/or its variants are implemented in a mobile terminal. It should be understood, however, that the techniques described herein are not limited to such a configuration. The techniques could be implemented in the reverse manner, for example. In some systems, wireless devices may be configured to carry out both methods.

Figure 13:
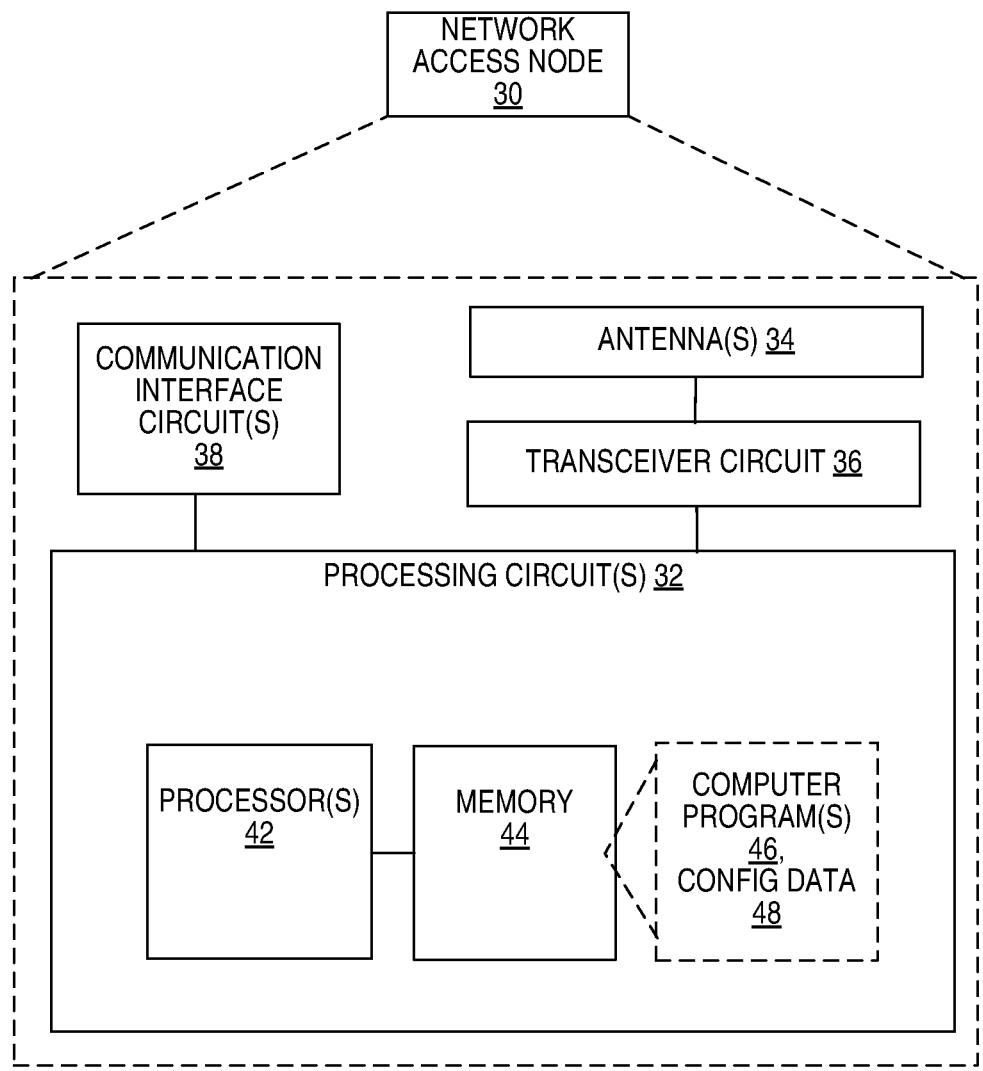
FIG. 13 illustrates a block diagram of a network access node, according to some embodiments.
Figure 14:
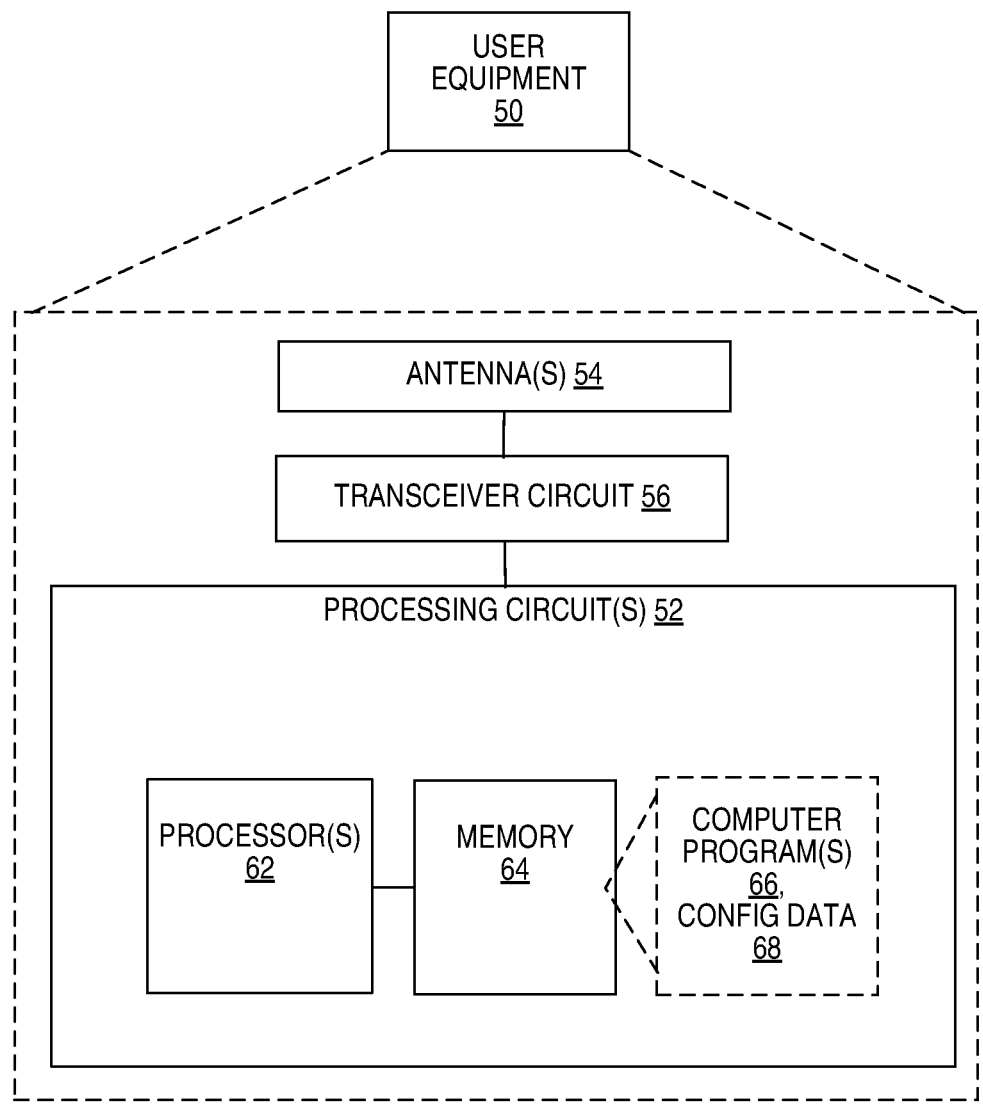
FIG. 14 illustrates a block diagram of a user equipment, according to some embodiments.

FIGS. 13 and 14 illustrate features of an example network access node (e.g., a wireless base station) and a user equipment, respectively. In the detailed discussion of those figures that follows, it is assumed that the techniques corresponding to FIG. 11 are implemented in the network access node of FIG. 13 while the techniques corresponding to FIG. 12 are implemented in the user equipment of FIG. 14. Again, however, it should be understood that the reverse situation may apply, in some cases, or that embodiments of both techniques may be implemented in a single wireless device.

FIG. 13 illustrates a diagram of a network access node 30, such as a base station, according to some embodiments. The network node 30 facilitates communication between wireless devices and the core network. The network access node 30 includes a communication interface circuit 38 includes circuitry for communicating with other nodes in the core network, radio nodes, and/or other types of nodes in the network for the purposes of providing data and cellular communication services. The network access node 30 communicates with wireless devices via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services.

The network access node 30 also includes one or more processing circuits 32 that are operatively associated with the communication interface circuit 38 and/or the transceiver circuit 36. The network access node 30 uses the communication interface circuit 38 to communicate with network nodes and the transceiver 36 to communicate with user equipments. For ease of discussion, the one or more processing circuits 32 are referred to hereafter as "the processing circuit 32." The processing circuit 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 42 may be multi-core, i.e., having two or more processor cores utilized for enhanced performance, reduced power consumption, and more efficient simultaneous processing of multiple tasks.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32.

In general, the memory 44 comprises one or more types of computer-readable storage media providing non-transitory storage of the computer program 46 and any configuration data 48 used by the network access node 30. Here, "non-transitory" means permanent, semi-permanent, or at least temporarily persistent storage and encompasses both long-term storage in non-volatile memory and storage in working memory, e.g., for program execution.

According to various embodiments of the techniques described herein, a transmitting apparatus and/or a receiver apparatus can perform communications using various combinations of the techniques described above, e.g., in connection with FIGS. 11 and 12. For example, referring back to FIG. 13, the processor 42 of the processing circuit 32 of network access node 30 may execute a computer program 46 stored in the memory 44 that configures the processor 42 to operate the network access node 30 as a transmitter apparatus that carries out a method like that illustrated in FIG. 11, or a variant of that method. Processing circuit 32 may comprise specialized digital hardware for performing Discrete Fourier Transform (DFT)/Inverse DFT (IDFT) processing, in cooperation with one or more program-based processors, in some embodiments.

In some embodiments, processor 42 is configured, for example, to control the network node to transmit, within a group of time-frequency resources scheduled in a first time interval for a first user, a plurality of DMRS symbols, where the plurality of DMRS symbols within the group of time-frequency resources are more densely arranged in the frequency domain than in the time domain, and to transmit, within the group of time-frequency resources scheduled in the first time interval for the first user, a plurality of SS symbols, where the plurality of SS symbols within the group of time-frequency resources are more densely arranged in the time domain than in the frequency domain.

The network access node 30 shown in FIG. 13 may be referred to as a transmitter apparatus, a node, network node or a radio network node. Network access node 30 can be, for example, any kind of network access node that may include a base station, radio base station, base transceiver station, evolved Node B (eNodeB), Node B, relay node, access point, wireless access point, radio access point, UltraDense Network (UDN)/Software Defined Network (SDN) radio access node, Remote Radio Unit (RRU), Remote Radio Head (RRH), etc.

FIG. 14 illustrates a diagram of a receiver apparatus, such as a user equipment (UE) 50, according to some embodiments. To ease explanation, the UE 50 may also be considered to represent any wireless device that may operate in a network. The UE 50 herein can be any type of wireless device capable of communicating with a network node or another UE over radio signals. The UE 50 may also be radio communication device, target device, device to device (D2D) UE, machine type UE or UE capable of machine to machine communication (M2M), a sensor equipped with UE, PDA (personal digital assistant), Tablet, mobile terminals, smart phone, laptop embedded equipped (LEE), laptop mounted equipment (LME), USB dongles, Customer Premises Equipment (CPE), etc.

The UE 50 communicates with a radio node or base station, such as network access node 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services.

The UE 50 also includes one or more processing circuits 52 that are operatively associated with the radio transceiver circuit 56. The processing circuit 52 comprises one or more digital processing circuits 62, e.g., one or more microprocessors, microcontrollers, DSPs, FPGAs, CPLDs, ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

The UE 50, e.g., using processing circuitry 52, may be configured to perform all or some of the techniques described above, and in particular in connection to FIG. 12. For example, the processor 62 of the processor circuit 52 may execute a computer program 66 stored in the memory 64 that configures the processor 62 to operate as a receiver apparatus, as discussed above. The processing circuit 52 of the UE 50 may thus be configured to perform one or more methods as disclosed above, such as the method illustrated in FIGS. 5, 6 and 12, and variants thereof.

For instance, the processing circuit 52 may be configured, in some embodiments, to control the transceiver circuit and to receive, within a group of time-frequency resources scheduled in a first time interval for the receiver, a plurality of DMRS symbols, where the plurality of DMRS symbols within the group of time-frequency resources are more densely arranged in the frequency domain than in the time domain, and to receive, within the group of time-frequency resources scheduled in the first time interval for the receiver, a plurality of SS symbols, where the plurality of SS symbols within the group of time-frequency resources are more densely arranged in the time domain than in the frequency domain. The processing circuit 52 may be further configured, in these embodiments, to perform channel estimation using the DMRS symbols and to demodulate data symbols within the group of time-frequency resources, based on the channel estimation, as well as to estimate or update an estimate of a frequency error for the user-specific transmission, using the SS symbols.

It should be appreciated that the processing circuits 32 and 52 of FIGS. 13 and 14, respectively, can be understood to implement a number of functional modules, where each functional module may represent a module of software or firmware executing on a processing circuit, or a functional grouping of digital hardware, or a combination of both. Each functional module may correspond to one or more of the steps illustrated in the process flow diagrams of FIGS. 11 and 12, for example.

Figure 15:
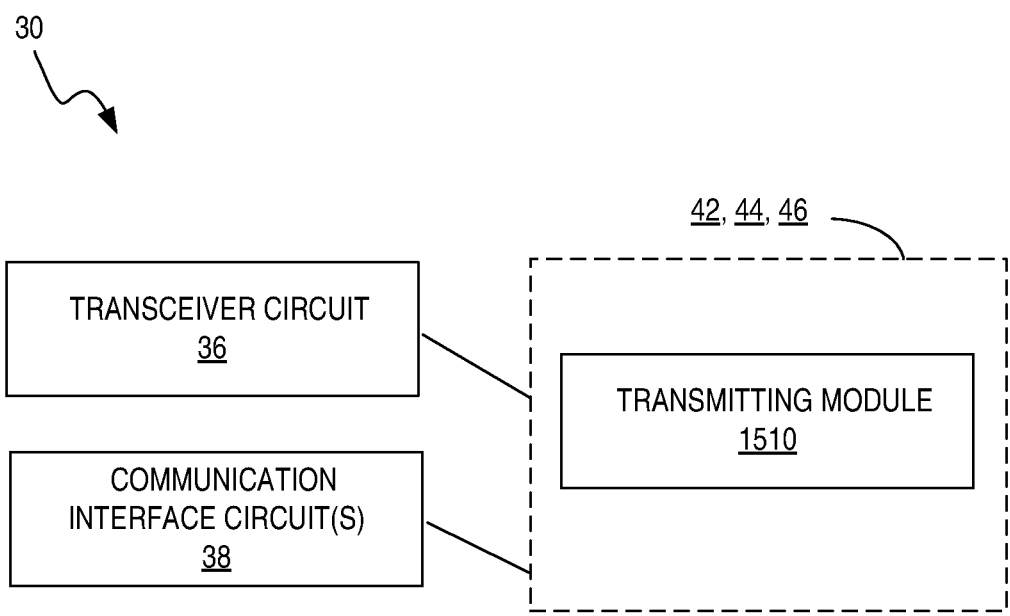
FIG. 15 illustrates another view of a network access node, according to some embodiments.

In such an example, FIG. 15 illustrates a transmitting apparatus that functionally includes a transmitting module 1510 for transmitting, within a group of time-frequency resources scheduled in a first time interval for a first user, a plurality of DMRS symbols, wherein the plurality of DMRS symbols within the group of time-frequency resources are more densely arranged in the frequency domain than in the time domain. The transmitting module 1510 is also for transmitting, within the group of time-frequency resources scheduled in the first time interval for the first user, a plurality of SS symbols, wherein the plurality of SS symbols within the group of time-frequency resources are more densely arranged in the time domain than in the frequency domain.

Figure 16:
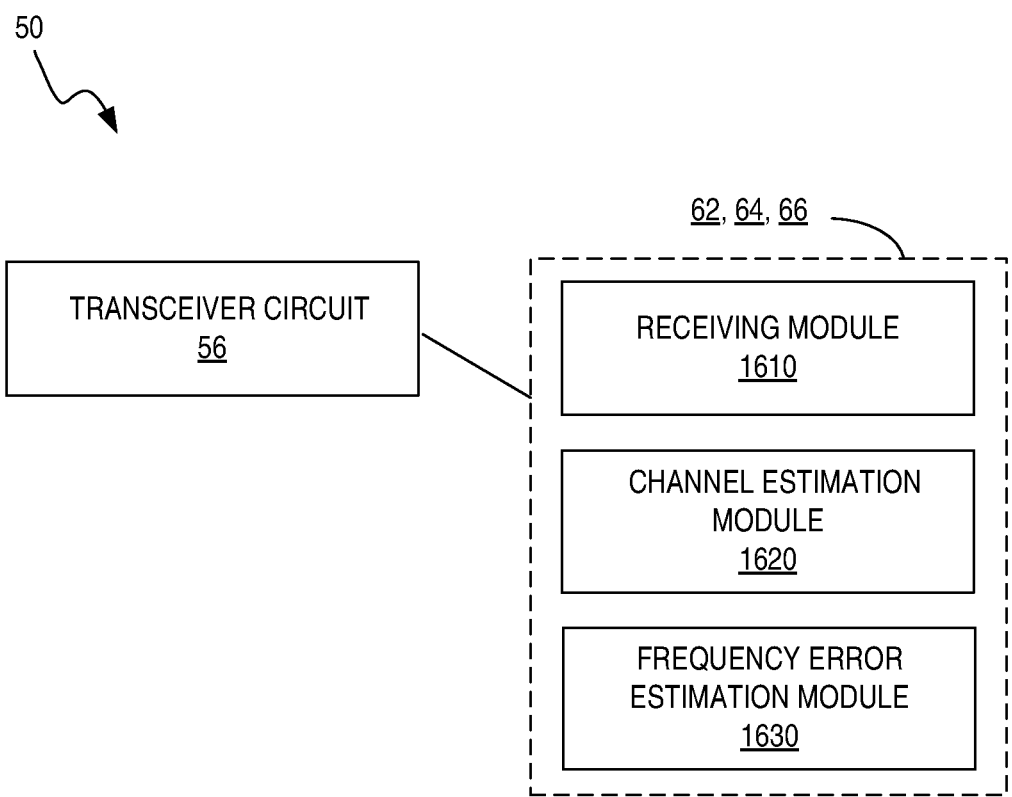
FIG. 16 illustrates another view of a user equipment, according to some embodiments.

In a corresponding example, FIG. 16 illustrates a receiving apparatus that functionally includes a receiving module 1610 for receiving, within a group of time-frequency resources scheduled in a first time interval for the receiver, a plurality of DMRS symbols, wherein the plurality of DMRS symbols within the group of time-frequency resources are more densely arranged in the frequency domain than in the time domain. The receiving module 1610 is also for receiving, within the group of time-frequency resources scheduled in the first time interval for the receiver, a plurality of synchronization signal, SS, symbols, wherein the plurality of SS symbols within the group of time-frequency resources are more densely arranged in the time domain than in the frequency domain. The functional implementation also includes a channel estimation module 1620 for performing channel estimation using the DMRS symbols and demodulating data symbols within the group of time-frequency resources, based on the channel estimation. The implementation further includes a frequency error estimation module 1630 for estimating or updating an estimate of a frequency error for the user-specific transmission, using the SS symbols.

Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method, in a receiver, of receiving a user-specific transmission comprising user data symbols and user-specific reference signal symbols, the method comprising:
    receiving, within a group of time-frequency resources scheduled in a first time interval for the receiver, a plurality of demodulation reference signal (DMRS) symbols,
        wherein the plurality of DMRS symbols within the group of time-frequency resources are more densely arranged in the frequency domain than in the time domain;
    receiving, within the group of time-frequency resources scheduled in the first time interval for the receiver, a plurality of synchronization signal (SS) symbols,
        wherein the plurality of SS symbols within the group of time-frequency resources are more densely arranged in the time domain than in the frequency domain;
    performing channel estimation using the DMRS symbols and demodulating data symbols within the group of time-frequency resources, based on the channel estimation; and
    estimating or updating an estimate of a frequency error for the user-specific transmission, using the SS symbols.

2. The method of claim 1, wherein the method further comprises:
    receiving, within a group of time-frequency resources scheduled in a second time interval for the receiver, a plurality of DMRS symbols, wherein the plurality of DMRS symbols within the group of time-frequency resources scheduled in the second time interval for the receiver are more densely arranged in the frequency domain than in the time domain;
    receiving, within the group of time-frequency resources scheduled in the second time interval for the receiver, a plurality of SS symbols, wherein the plurality of SS symbols within the group of time-frequency resources scheduled in the second time interval for the receiver are more densely arranged in the time domain than in the frequency domain;
    performing channel estimation using the DMRS symbols within the group of time-frequency resources scheduled in the second time interval for the receiver and demodulate data symbols within the group of time-frequency resources scheduled in the second time interval for the receiver, based on the channel estimation; and
    estimating or updating an estimate of a frequency error for the user-specific transmission, using the SS symbols within the group of time-frequency resources scheduled in the second time interval for the receiver;
        wherein the number and/or arrangement of the SS symbols or the DMRS symbols, or both, differ from the first time interval to the second time interval.

3. The method of claim 2, wherein the minimum spacing in the time domain between SS symbols is greater in the second time interval than in the first time interval.

4. A receiving apparatus configured to receive a user-specific transmission comprising user data symbols and user-specific reference signal symbols, the receiving apparatus comprising:
    a transceiver circuit; and
    a processing circuit operatively coupled to the transceiver circuit, wherein the processing circuit is configured to:
        receive, within a group of time-frequency resources scheduled in a first time interval for the receiver, a plurality of demodulation reference signal (DMRS) symbols, wherein the plurality of DMRS symbols within the group of time-frequency resources are more densely arranged in the frequency domain than in the time domain;
        receive, within the group of time-frequency resources scheduled in the first time interval for the receiver, a plurality of synchronization signal (SS) symbols, wherein the plurality of SS symbols within the group of time-frequency resources are more densely arranged in the time domain than in the frequency domain;
    perform channel estimation using the DMRS symbols and demodulating data symbols within the group of time-frequency resources, based on the channel estimation; and
    estimate or update an estimate of a frequency error for the user-specific transmission, using the SS symbols.

5. The receiving apparatus of claim 4, wherein all of the SS symbols within the group of time-frequency resources are on a single subcarrier.

6. The receiving apparatus of claim 4, wherein all of the DMRS symbols within the group of time-frequency resources are on a single Orthogonal Frequency Division Multiplexing (OFDM) symbol.

7. The receiving apparatus of claim 4, wherein the plurality of SS symbols comprises a first symbol positioned in an OFDM symbol immediately following an OFDM symbol comprising DMRS symbols, and a second symbol positioned in the last OFDM symbol in the first time interval.

8. The receiving apparatus of claim 4, wherein the plurality of SS symbols comprises a third symbol positioned in an OFDM symbol between the OFDM symbols containing the first and second symbols.

9. The receiving apparatus of claim 4, wherein the processing circuit is configured to:

receive, within a group of time-frequency resources scheduled in a second time interval for the receiver, a plurality of DMRS symbols, wherein the plurality of DMRS symbols within the group of time-frequency resources scheduled in the second time interval for the receiver are more densely arranged in the frequency domain than in the time domain;

receive, within the group of time-frequency resources scheduled in the second time interval for the receiver, a plurality of SS symbols, wherein the plurality of SS symbols within the group of time-frequency resources scheduled in the second time interval for the receiver are more densely arranged in the time domain than in the frequency domain;

perform channel estimation using the DMRS symbols within the group of time-frequency resources scheduled in the second time interval for the receiver and demodulate data symbols within the group of time-frequency resources scheduled in the second time interval for the receiver, based on the channel estimation; and estimate or update an estimate of a frequency error for the user-specific transmission, using the SS symbols within the group of time-frequency resources scheduled in the second time interval for the receiver;

wherein the number and/or arrangement of the SS symbols or the DMRS symbols, or both, differ from the first time interval to the second time interval.

10. The receiving apparatus of claim 9, wherein the minimum spacing in the time domain between SS symbols is greater in the second time interval than in the first time interval.

* * * * *